United States Patent
Amin-Shahidi et al.

(10) Patent No.: US 10,528,098 B2
(45) Date of Patent: Jan. 7, 2020

(54) THERMAL AWARE WORKLOAD SCHEDULING

(71) Applicant: HGST Netherlands B.V., Amsterdam (NL)

(72) Inventors: Darya Amin-Shahidi, San Jose, CA (US); Abhishek Dhanda, San Jose, CA (US); Toshiki Hirano, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 188 days.

(21) Appl. No.: 15/197,410

(22) Filed: Jun. 29, 2016

(65) Prior Publication Data
US 2018/0004260 A1  Jan. 4, 2018

(51) Int. Cl.
| G06F 1/20 | (2006.01) |
| G06F 11/30 | (2006.01) |
| G06F 11/34 | (2006.01) |
| G06F 1/3206 | (2019.01) |
| G06F 1/329 | (2019.01) |
| G06F 9/50 | (2006.01) |

(52) U.S. Cl.
CPC ............ *G06F 1/206* (2013.01); *G06F 1/3206* (2013.01); *G06F 1/329* (2013.01); *G06F 9/5094* (2013.01); *G06F 11/3058* (2013.01); *G06F 11/3433* (2013.01); *G06F 2201/81* (2013.01); *Y02D 10/124* (2018.01); *Y02D 10/24* (2018.01)

(58) Field of Classification Search
CPC .. G06F 1/206; G06F 11/3433; G06F 11/3058; G06F 9/5016
See application file for complete search history.

(56) References Cited

U.S. PATENT DOCUMENTS

| 5,566,077 A | 10/1996 | Kulakowski et al. |
| 7,447,920 B2 | 11/2008 | Sharma et al. |
| 7,765,438 B2 | 7/2010 | Haugh |
| 8,095,851 B2 | 1/2012 | Diggs et al. |
| 8,595,432 B1 | 11/2013 | Vinson et al. |
| 8,751,653 B2 * | 6/2014 | Matsumoto ........... G06F 9/5088 709/226 |
| 9,192,078 B2 | 11/2015 | Pronozuk et al. |
| 2006/0143419 A1 * | 6/2006 | Tulyani ................... G06F 3/061 711/165 |
| 2010/0106988 A1 * | 4/2010 | Hayashi ................. G06F 1/206 713/320 |

(Continued)

FOREIGN PATENT DOCUMENTS

WO     2015130645 A1    9/2015

*Primary Examiner* — Vincent H Tran

(57) ABSTRACT

Systems, software, devices, and methods of distributing a workload among available data storage devices in a thermal aware manner are described herein. More specifically, the examples herein discuss distributing the workload among the available data storage devices in a thermal aware manner that optimizes collective IOPs of the data storage devices in an enclosure. The thermal aware distribution of the storage operations is determined by a thermal model that predicts thermal characteristics of the data storage system based on inlet air characteristics of the enclosure, performance characteristics and thermal constraints of the data storage devices, and constraints of the workload.

21 Claims, 6 Drawing Sheets

(56) References Cited

U.S. PATENT DOCUMENTS

| | | | |
|---|---|---|---|
| 2013/0073875 A1* | 3/2013 | Anderson | G06F 1/3293 |
| | | | 713/300 |
| 2013/0174176 A1 | 6/2013 | Kopylovitz | |
| 2015/0241887 A1* | 8/2015 | Brower | G06F 1/206 |
| | | | 700/299 |
| 2015/0378414 A1* | 12/2015 | Kato | G06F 1/20 |
| | | | 713/340 |
| 2016/0188365 A1* | 6/2016 | Bodas | G06F 9/4881 |
| | | | 718/102 |
| 2016/0363973 A1* | 12/2016 | Cudak | G06F 1/206 |
| 2017/0046079 A1* | 2/2017 | Chinnakkonda Vidyapoornachary | G06F 3/0616 |
| 2017/0318707 A1* | 11/2017 | Shabbir | H05K 7/20836 |

\* cited by examiner

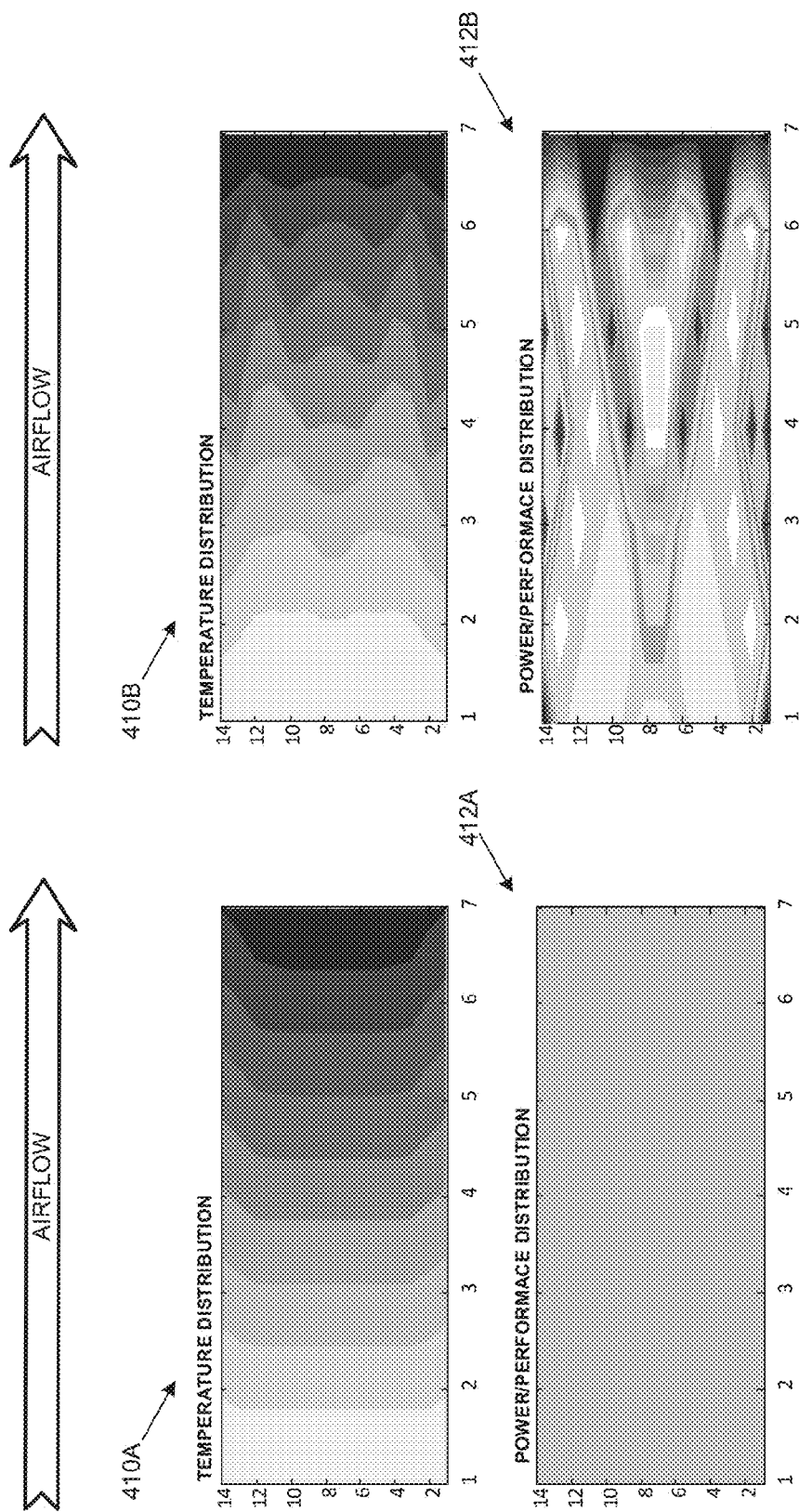

THERMAL AWARE WORKLOAD SCHEDULING

TECHNICAL FIELD

Aspects of the disclosure relate to the field of data storage and, more particularly, to thermal aware workload scheduling in data storage systems.

TECHNICAL BACKGROUND

Computer and network systems such as data storage systems, server systems, cloud storage systems, personal computers, and workstations, typically include data storage devices for storing and retrieving data. These data storage devices can include hard disk drives (HDDs), solid-state drives (SSDs), tape storage devices, optical storage drives, hybrid storage devices that include both rotating and solid state data storage elements, and other mass storage devices.

As networked computer systems grow in numbers and capability, there is a need for more storage system capacity. Cloud computing and large-scale data processing further increase the need for digital data storage systems that are capable of transferring and holding very large amounts of data. Data centers typically include many rack-mountable storage units, which store the large amounts of data.

One approach to providing sufficient data storage in data centers is the use of arrays of independent data storage devices. Many data storage devices can be held in an electronics enclosure. An electronics enclosure is a modular unit that can hold and operate independent data storage devices in an array, computer processors, routers and other electronic equipment. The data storage devices are held and operated in close proximity within the electronics enclosure, so that many data storage devices can be fit into a defined volume. Operating many data storage devices within close proximity within the electronics enclosure can create heat issues and lead to premature failure of the data storage devices. Accordingly, electronics enclosures typically include fans or other cooling devices. For example, an enclosure may have fans on one side pulling out hot air while cold air enters the enclosure at the opposite end. This results in a temperature gradient across the subsystem.

File systems run by a host system or a server, such as object storage software, control how data is stored and retrieved. File systems typically distribute storage operations evenly or uniformly among the available data storage devices. The uniform distribution optimizes the average temperature in the enclosure, reducing heat issues that can potentially lead to the premature failure of the data storage devices.

OVERVIEW

To provide enhanced operation of data storage devices and systems, various systems, apparatuses, methods, and software are provided herein. In a first example, a data storage system is presented. The data storage system includes multiple data storage devices each configured to store data, an enclosure configured to encase and physically support the multiple storage devices, and a control system. The control system is configured to model thermal characteristics of a data storage system based on inlet air characteristics of the enclosure, performance characteristics and thermal constraints of the data storage devices, and constraints of a workload. The control system is further configured to identify a thermal aware allocation of the workload among the data storage devices based on the thermal model and distribute the workload among the data storage devices in accordance with the thermal aware allocation.

In another example, a method of identifying a thermal aware allocation of a workload among thermally-coupled data storage devices encased in an enclosure of a data storage system is provided. The method includes identifying performance characteristics and thermal constraints associated with the thermally-coupled data storage devices, identifying inlet air characteristics of the enclosure, and identifying constraints associated with the workload. The method further includes modeling thermal characteristics of the data storage system based on the inlet air characteristics of the enclosure, the performance characteristics and thermal constraints of the data storage devices, and the constraints associated with the workload, and subsequently identifying a thermal aware allocation of the workload among the data storage devices based on the thermal model.

In another example, a computer-readable storage medium is provided. The computer-readable storage medium includes instructions which, when executed by one or more processors, cause the one or more processors to identify performance characteristics and thermal constraints associated with thermally-coupled data storage devices of a data storage system, identify inlet air characteristics of the enclosure, identify constraints associated with the workload, and model thermal characteristics of the data storage system based on the inlet air characteristics of the enclosure, the performance characteristics and thermal constraints of the data storage devices, and the constraints associated with the workload. The instructions, when executed by the one or more processors, further cause the one or more processors to identify a thermal aware allocation of the workload among the data storage devices based on the thermal model.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 4A and 4B depict diagrams illustrating example temperature gradients with corresponding power/performance distributions.

DETAILED DESCRIPTION

Data storage devices, such as hard disk drives (HDDs), solid-state drives (SSDs), and hybrid disk drives that have both rotating and solid-state storage elements, can be included in various arrayed configurations, such as rack-mounted modular enclosures which house dozens of individual drives. Cooling or ventilation fans can be included with the enclosures to direct airflow over the various drives. Power supply equipment can also be included to provide power to the various storage devices, to convert input power from a utility or building infrastructure to a form usable by the storage devices.

File systems run by a host system or a server, such as object storage software, control how data is stored and retrieved. As discussed above, file systems typically attempt to distribute a workload (e.g., storage operations) evenly or uniformly among the available data storage devices such that each data storage device maintains an average temperature in the enclosure.

The examples herein discuss various systems, software, devices, and methods of distributing a workload among available data storage devices in a thermal aware manner. More specifically, the examples herein discuss distributing the workload among the available data storage devices in a thermal aware manner that optimizes collective Input/Output Operations Per Second (IOPs) of the data storage devices in the enclosure. The thermal aware distribution of the storage operations is determined by a thermal model that predicts thermal characteristics of the data storage system based on inlet air characteristics of the enclosure, performance characteristics and thermal constraints of the data storage devices, and constraints of the workload.

Figure 1:
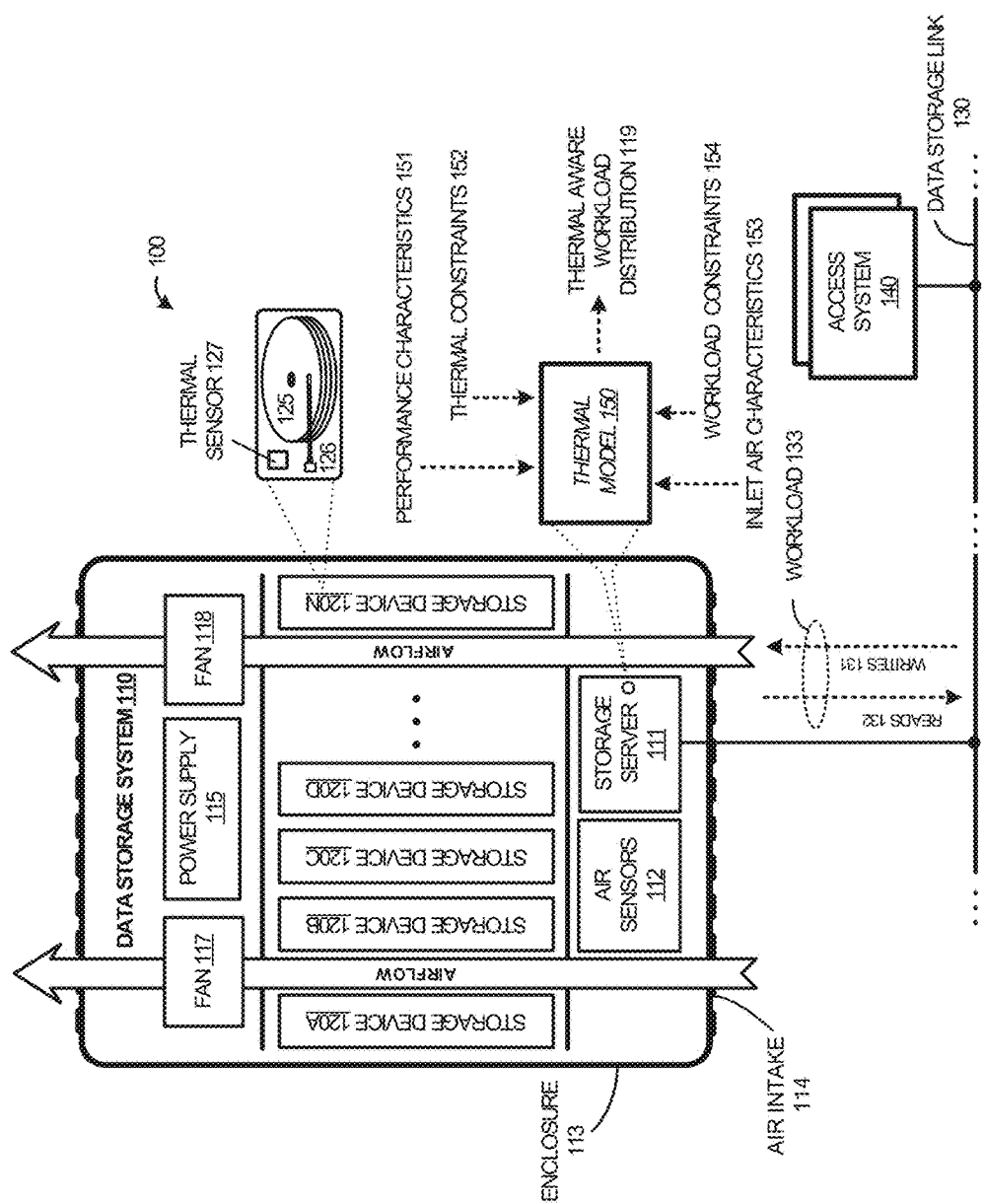
FIG. 1 depicts a system diagram illustrating an example data system.

FIG. 1 depicts a system diagram illustrating an example system 100. Example system 100 includes a data storage system 110 and one or more access (or host) systems 140. Data storage system 110 and access system 140 communicate over data storage link 130. Data storage system 110 can be included in an environment that includes one or more data storage arrays, such as, for example, a rackmount computing environment.

As shown in the example of FIG. 1, data storage system 110 includes an enclosure 113 encasing a storage server (or controller) 111, air sensor(s) 112, power supply 115, fans 117-118, and multiple data storage devices 120a-120n. Each of data storage devices 120a-120n can include one or more rotating storage media. For example, a detailed view of data storage device 120n is shown including rotating media 125, read/write heads/armature assembly 126, and a thermal sensor 127. The thermal sensor 127 can, among other functions, measure temperatures of an individual data storage device 120. The measured temperatures can include a surface temperature or a measure of heat dissipation from the individual storage device. In some embodiments, the thermal sensors 127 can measure heat dissipation from each of the individual data storage devices 120a-120n and provide the information to the storage server 111. In some examples, one or more of data storage devices 120a-120n include solid state storage media in addition to or in lieu of a rotating storage media. Combinations or variations of rotating, solid state storage media and/or other media types are also possible. Furthermore, data storage system 110 can include additional components or omit particular components in some embodiments. For example, some embodiments of the data storage system 110 can omit air sensors 112.

Storage server 111 is communicatively coupled to data storage devices 120a-120n and air sensors 112. Although storage server 111 is shown as an internal component of the data storage system 110 in the example of FIG. 1, it should be understood that storage controller 111 can be included in other elements or components external to data storage system 110. Furthermore, elements, portions or components of storage server 111 can alternatively or additionally be included in individual ones of data storage devices 120a-120n. Air sensors 112 can measure inlet air characteristics at one or more predefined locations within the enclosure 113. The inlet air characteristics can include one or more of air temperature or air speed.

In some embodiments, one or more of the inlet air characteristics can be estimated rather than measured based on, for example, fan drive signal characteristics. For example, the storage server can estimate the air speed and/or the corresponding air temperature at air intake 114 based on the fan drive signal characteristics. Among other characteristics, the fan drive signal characteristics can include a voltage or a duty cycle. Alternatively, or additionally, the air sensors 112 can measure the air intake characteristics at or proximate to air intake 114 of the enclosure 113. As discussed herein, the air intake characteristics can include, for example, air temperature and air speed.

As shown in the example of FIG. 1, the storage server 111 includes a thermal model 150 that utilizes various inputs to identify a thermal aware workload distribution 119. The thermal aware workload distribution 119 is an optimized distribution of workload 133. More specifically, the thermal aware workload distribution 119 is selected to maximize collective Input/Output Operations Per Second (IOPS) of the multiple data storage devices relative to other distributions of the workload while maintaining the multiple data storage devices within the thermal constraints of the data storage devices. Although shown as included with the storage server 111, it is appreciated that the thermal model 150 could be located on an access system 140 and/or distributed across multiple systems.

The thermal model models thermal characteristics of a data storage system based on inlet air characteristics of the enclosure, performance characteristics and thermal constraints of the data storage devices, and constraints of a workload. The performance characteristics of the data storage devices can include power versus performance operating curves for each of the data storage devices. The power versus performance operating curves can vary for each of the one or more data storage devices. The thermal constraints of the data storage devices can include one or more safe operating temperature thresholds. In some embodiments, the storage server 111 or one or more of the data storage devices 120a-120n monitor temperatures of each of the multiple data storage devices to ensure that the data storage devices do not exceed the one or more safe operating temperature thresholds.

The constraints of the workload (or workload constraints) can include a breakdown of storage operations (e.g., read or write transactions) that comprise the workload. Read operations need to go to one or more specific destination drives. However, write transactions can be assigned to any drives.

In operation, data storage system 110 receives storage operations (e.g., read or write transactions) over data storage link 130 issued by access system 140, such as write operations 131 and read operations 132. Responsive to read operations 132, individual data storage devices in data storage system 110 can retrieve data stored thereon (e.g., stored on associated storage media) for transfer to access system 140. Likewise, responsive to write operations 131, individual data storage devices in data storage system 110 store data therein (e.g., stored on associated storage media).

A file system (not shown) can be executed or run by a host system, (e.g., access system 140 and/or a server, e.g., storage server 111). The file system determines where data is to be written and maintains information about where the data is written so that the data can be subsequently read or accessed. In some embodiments, the thermal aware workload distribution 119 can be fed to access system 140 and/or storage server 111.

As discussed herein, the access system 140 and/or storage server 111 identify, calculate, and/or otherwise determine a thermal aware workload distribution 119 based on inlet air characteristics of the enclosure, performance characteristics and thermal constraints of the data storage devices, and constraints of a workload. The thermal aware workload distribution 119 identifies an allocation of a particular workload among the data storage devices 120a-n for distribution. In some embodiments, a file system may utilize the thermal aware workload distribution 119 to non-uniformly distribute the storage operations of the workload (i.e., write operations 131 and read operations 132) in a manner that collective increases IOPs of the data storage device subject to the power (performance) and temperature constraints of the storage devices 120a-120n. It should be understood that other components of data storage system 110 and data storage devices 120a-120n are omitted for clarity in example of FIG. 1, such as transaction queues, chassis, interconnect, read/write heads, media, armatures, preamps, transceivers, processors, amplifiers, motors, servos, enclosures, and other electrical and mechanical elements.

Figure 2:
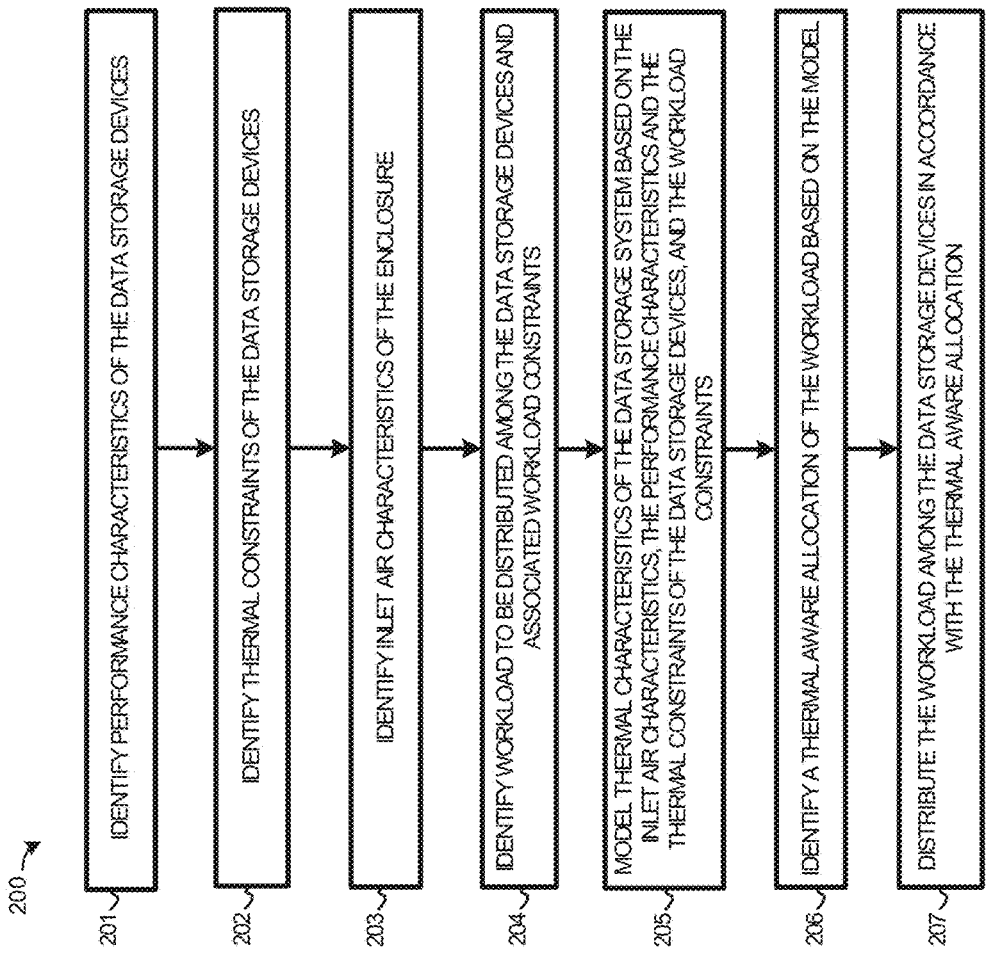
FIG. 2 depicts a flow diagram illustrating an example method of operating a data storage system or access (or host) system.

To further illustrate the operation of example system 100, FIG. 2 is provided. FIG. 2 depicts a flow diagram 200 illustrating a method of distributing a workload among multiple data storage devices 120a-120n of data storage system 110 based on the thermal model 150 of the data storage system 110. The thermal model models thermal characteristics of a data storage system based on inlet air characteristics of the enclosure, performance characteristics and thermal constraints of the data storage devices, and constraints of a workload. As discussed herein, the workload is distributed according to a thermal aware workload distribution 119. The operations of FIG. 2 are discussed below with reference to performance by one or more components of data storage system 110 of FIG. 1 (e.g., storage server 111). However, the operations can be performed, alternatively or additionally, in whole or in part, by one or more processors of access system 140 of FIG. 1.

In the example of FIG. 2, data storage system 110 stores and retrieves data in data storage system 110 using data storage devices 120a-120n in enclosure 113. Data storage system 110 receives read and write operations 132 and 131 over data storage link 130, and data storage device 120a-120n handle the operations, such as by storing write data or retrieving read data. Read operations can include reads 132 received by storage server 111, and write operations can include writes 131 received by storage server 111. It is appreciated that other transactions or operations can be received for handling by storage server 111, such as metadata operations, maintenance operations, or administration operations, among others.

At operation 201, the data storage system 110 identifies performance (or power) characteristic of the data storage devices. The performance (or power) characteristics of the data storage devices can include power versus performance operating curves of each of the data storage devices. In some embodiments, the performance (or power) characteristics can be provided during provisioning of the data storage device. Alternatively, or additionally, the performance (or power) characteristics are detectable by the storage server 111 and/or access system 140. For example, the data storage system 110 can identify performance (or power) characteristics of the data storage devices based on serial, model or other identification numbers. Other techniques for identification are also possible.

At operation 202, the data storage system 110 identifies thermal constraints of the data storage devices. The thermal constraints can include, for example, one or more safe operating temperature thresholds for each data storage device. In some embodiments, one or more components of the data storage system 110 can monitor temperatures of each of the multiple data storage devices to ensure that the data storage devices do not exceed the one or more safe operating temperature thresholds. For example, the air sensors 112 can measure air characteristics of the air in the enclosure 113 at one or more locations and provide the air characteristics to storage server 111. The air characteristics can include air temperature and/or air speed at the one or more locations in the enclosure 113. As discussed herein, the thermal constraints of the data storage devices 120a-120n can indicate when one or more temperatures or temperature measurements exceed desired limits or thresholds for data storage devices 120a-120n. The temperature thresholds can include thresholds established to prevent data loss, data corruption, or malfunction of the data storage devices. For example, high operating temperatures of the data storage devices can hasten various electrical, mechanical, fluid, or magnetic elements into a degraded operation or malfunction.

At operation 203, the data storage system 110 identifies inlet air characteristics of the enclosure. As discussed herein, the inlet air characteristics of the enclosure can be estimated by the data storage system 110 based on one or more fan settings. For example, fan drive signal characteristics such as voltage or duty cycles can be utilized to estimate the air temperature or air speed at the air intake. In some embodiments, the data storage system 110 includes one or more air speed or air temperature sensors. In this instance, the data storage system 110 can measure and monitor air temperature or air speed.

At operation 204, the data storage system 110 identifies a workload (to be distributed among the data storage devices 120a-120n) and associated workload constraints. For example, the workload can be received from an access system 140 over the data storage link 130.

At operation 205, the data storage system 110 models thermal characteristics of a data storage system based on the inlet air characteristics of the enclosure, the performance characteristics and thermal constraints of the data storage devices, and the constraints of a workload. The model of the thermal characteristics can include a thermal profile of the enclosure including air temperatures across the enclosure as well as predicted temperatures or thermal profiles for each component of the data storage system 110 (e.g., data storage devices 120a-120n). The thermal profiles associated with data storage devices 120a-120n can vary over time, such as due to ambient temperature changes outside of enclosure 113, changes in operational workloads of individual data storage devices, or changes in ventilation or climate controls associated with data storage system 110, among other fluctuations. Moreover, the components of the data storage system 110 are thermally-coupled, meaning that changes in temperature in one component can affect other components. In some examples, the predicted air temperatures across the enclosure can comprise a predicted air temperature at each of the multiple data storage devices. Example predicted air temperature distributions are shown and discussed in greater detail with reference to FIGS. 4A and 4B.

At operation 206, the data storage system 110 identifies a thermal aware allocation or distribution of the workload based on the modeled thermal characteristics of the data storage system. For example, the data storage system 110 can model the thermal characteristics of a workload distribution to select, determine, or otherwise identify a thermal aware allocation of the workload that maximizes collective IOPS of the multiple data storage devices relative to other allocations of the workload while maintaining the multiple data storage devices within the thermal constraints of the data storage devices.

Lastly, at operation 207, the data storage system 110 distributes the workload among the data storage devices 120a-120n in accordance with the thermal aware allocation. In some examples, the data storage system 110 is configured to non-uniformly allocate the workload (e.g., storage operations of the workload) to particular ones of the data storage devices 120a-120n more than others of the data storage devices 120a-120n based on the modeled thermal characteristics of the data storage system while maintaining each of the multiple data storage devices within a safe temperature threshold. As discussed herein, the non-uniform allocation of the operations increases and/or otherwise optimizes collective IOPS of the data storage system 110 relative to other allocations of the workload including uniform allocations of the workload.

Returning to the elements of FIG. 1, data storage system 110 comprises a plurality of data storage devices 120a-120n. The data storage devices 120a-120n are coupled to storage server 111 by one or more storage links, which can comprise a serial Advanced Technology Attachment (ATA) interface, Serial Attached Small Computer System (SAS) interface, Integrated Drive Electronics (IDE) interface, Non-Volatile Memory Express (NVMe) interface, ATA interface, Peripheral Component Interconnect Express (PCIe) interface, Universal Serial Bus (USB) interface, wireless interface, Direct Media Interface (DMI), Ethernet interface, networking interface, or other communication and data interface, including combinations, variations, and improvements thereof. Data storage system 110 can also comprise cache systems, chassis, enclosures, fans, interconnect, cabling, or other circuitry and equipment.

Storage server 111 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Air sensors 112 can include air temperature and/or air speed sensors configured to detect the temperature and speed of the air entering enclosure 113. In some embodiments, the air sensors 112 can be included at or near the air intake 114. The air sensors 112 can include one or more air sensors that measure characteristics of the air in the enclosure 113 at one or more locations and provide air intake characteristics to storage server 111. The air intake characteristics can include, but are not limited to, air temperature and air speed at the one or more locations in the enclosure 113. The air sensors 112 provide the air intake characteristics to the storage server 111. Air sensors 112 can include various interfaces for communicating measured information (e.g., air intake characteristics) to storage server 111. The interfaces can include transceivers, analog-to-digital conversion elements, amplifiers, filters, signal processors, among other elements. In some examples, air sensors 112 can each include microcontroller elements, programmable logic, or discrete logic to control the operations of air sensors 112.

Enclosure 113 comprises structural elements to house and structurally support the elements of data storage system 110. Enclosure 113 can include chassis elements, frames, fastening elements, rackmount features, ventilation features, among other elements. In many examples, enclosure 113 also includes fans or other cooling and ventilation elements for providing airflow to the elements of data storage system 110.

Data storage system 110 also includes a power supply 115 to convert external input power sources or provide various forms of electrical energy to the elements of data storage system 110. Power supply 115 can comprise power conversion elements, power electronics, transformers, voltage conversion circuitry, among other elements. Power supply 115 can also include one or more ventilation fans to provide cooling and ventilation to power supply 115 and to other components in enclosure 113, such as indicated by fans 117-118, or additional fans.

Fans 117-118 provide airflow to elements within enclosure 113, such as the elements of data storage system 110. Fans 117-118 can comprise any fan type, such as axial-flow, centrifugal and cross-flow, or other fan types, including associated ducts, louvers, fins, or other directional elements, including combinations and variations thereof.

Each of data storage devices 120a-120n includes one or more computer readable storage media accessible via one or more read/write heads and associated electromechanical elements. In FIG. 1, an example detailed view of data storage device 120n is shown to highlight rotating media 125 and read/write heads and armature assembly 126, and these elements can be included in each of data storage devices 120a-120n, although variations are possible among the data storage devices, such as when solid state media are employed. Data storage devices 120a-120n can also each include processing circuitry, communication interfaces, armatures, preamps, transceivers, processors, amplifiers, motors, servos, enclosures, and other electrical and mechanical elements.

Data storage devices 120a-120n can each comprise a hard disk drive, hybrid disk drive, solid state drive, or other computer readable storage device, including combinations thereof. Data storage devices 120a-120n can each include further elements, such as thermal sensors 127. The computer readable storage media of data storage devices 120a-120n can each include rotating magnetic storage media, but can additionally include other media, such as solid state drive elements, caches, or cache systems. These other media can include solid state storage media, optical storage media, non-rotating magnetic media, phase change magnetic media, spin-based storage media, or other storage media, including combinations, variations, and improvements thereof. In some examples, data storage devices 120a-120n each comprise a hybrid hard drive employing solid state storage elements in addition to rotating magnetic storage media. Associated storage media can employ various magnetic storage schemes, such as random write techniques, shingled magnetic recording (SMR), perpendicular magnetic recording (PMR), or heat-assisted magnetic recording (HAMR), including combinations, variations, and improvements thereof.

Access system 140 can include processing elements, data transfer elements, and user interface elements. In some examples, access system 140 is a central processing unit (CPU) of a computing device or computing system. In other examples, access system 140 also includes memory elements, data storage and transfer elements, controller elements, logic elements, firmware, execution elements, and other processing system components. In yet other examples, access system 140 comprises a Redundant Array of Independent Disks (RAID) controller processor or storage system central processor, such as a microprocessor, microcontroller, Field Programmable Gate Array (FPGA), or other processing and logic device, including combinations thereof. Access system 140 can include, or interface with, user interface elements, which can allow a user of the example system 100 to control operations or to monitor the status or operations of the example system 100. The user interface elements can include graphical or text displays, indicator lights, network interfaces, web interfaces, software interfaces, user input devices, or other user interface elements. Access system 140 can also include interface circuitry and elements for handling communications over data storage link 130, such as logic, processing portions, buffers, transceivers, and the like.

Data storage link 130 can be a bus including one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one data storage link 130 is shown in FIG. 1, it should be understood that one or more discrete links can be employed between the elements of example system 100.

Figure 3A:
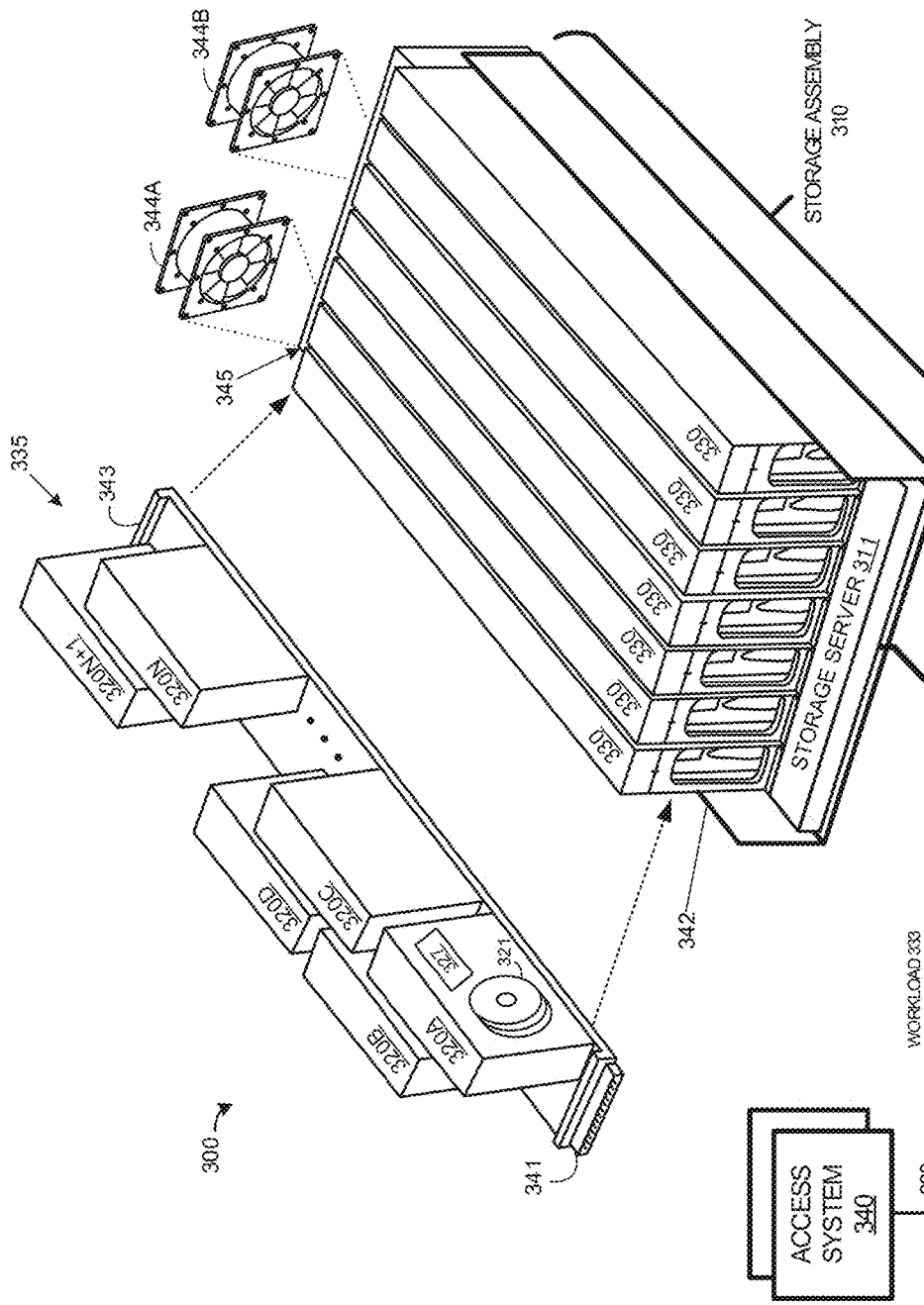
FIGS. 3A and 3B depict system diagrams illustrating various views of an example data system.
Figure 3B:
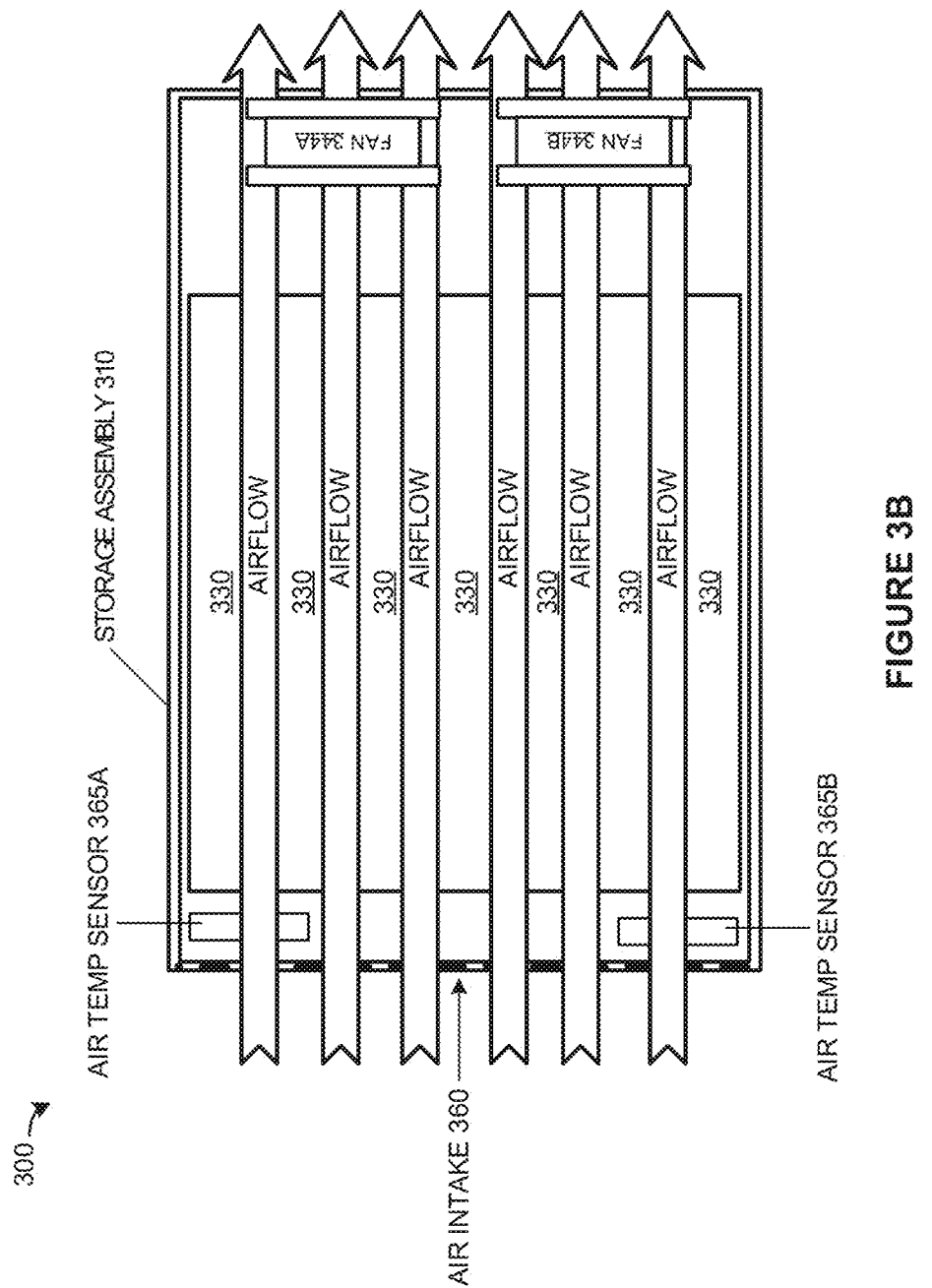

As a further example data storage system 110 employing a data storage array, FIGS. 3A and 3B are presented. FIG. 3A is a system diagram illustrating data storage system 300. Data storage system 300 includes storage assembly 310 and one or more access (or host) systems 340. Storage assembly 310 and access system 340 communicate over storage link 330. Various elements of storage assembly 310 can be included in data storage system 110 of FIG. 1, although variations are possible. Although one storage assembly 310 is shown in FIG. 3A, it should be understood that more than one storage assembly could be included and linked to access system 340 or other access (or host) systems, such as in a data storage environment employing many data storage arrays.

Storage assembly 310 can comprise a storage assembly with associated enclosure and structural elements, which is insertable into a rack that can hold other storage assemblies, such as a rackmount server environment. The enclosure can include structural elements, such as chassis 342 and trays 343, to mount the plurality of storage drives and can also include at least one external connector for communicatively coupling storage devices to link 330.

Storage assembly 310 can comprise a redundant array of independent disks (RAID) array, or a JBOD ("Just a Bunch Of Disks") device which include a plurality of independent disks which can be spanned and presented as one or more logical drives to access system 340. In some examples, storage assembly 310 comprises a virtual bunch of disks (VBOD) which adds one or more layers of abstraction between physical storage drives and external interfaces. A VBOD can employ various types of magnetic recording technologies and abstract front-end interactions from the particular recording technology. For example, shingled magnetic recording (SMR) hard disk drives typically have inefficiencies for random writes due to the shingled nature of adjacent tracks for data. In SMR examples, the VBOD abstracts the SMR drives and allows random writes and random reads while still having underlying SMR media which ultimately hold the associated data. Other recording techniques can be employed, such as perpendicular magnetic recording (PMR) or heat-assisted magnetic recording (HAMR), including variations, improvements, and combinations thereof.

Storage link 330 can include one or more links, although a single link is shown in FIG. 3A. Storage link 330 can comprise a storage or disk interface, such as Serial Attached ATA (SATA), Serial Attached SCSI (SAS), FibreChannel, Universal Serial Bus (USB), SCSI, InfiniBand, NVMe, Peripheral Component Interconnect Express (PCIe), Ethernet, Internet Protocol (IP), or other parallel or serial storage or peripheral interfaces, including variations and combinations thereof.

Access system 340 can include one or more computing and network systems, such as personal computers, servers, cloud storage systems, packet networks, management systems, or other computer and network systems, including combinations and variations thereof. In operation, access system 340 issues read and write commands or operations to storage assembly 310 over storage link 330, among other commands or operations which can include control instructions, storage media density instructions, metadata retrieval operations, configuration instructions, and the like. Likewise, storage assembly 310 can transfer read data over storage link 330, among other information such as graphical user interface information, status information, operational information, vibration information, temperature information, power information, failure notifications, alerts, and the like.

Storage assembly 310 includes a plurality of hard disk drives (HDDs), each mounted in an associated carrier tray 343 which is further encased in an enclosure to form a storage carrier 335, such as shown for HDDs 320A-320N+1 in tray 343 and storage carrier 335. A connector is provided for each of storage carriers 335 to couple the HDDs to an associated storage server 311. Multiple storage carriers 335 can be included into storage assembly 310 to form a storage array. Each HDD can be inserted into and removed from an associated storage carrier, and that storage carrier can then be inserted into an associated guide or track of storage assembly 310. Other configurations are possible, such as individually-mounted HDDs. As shown, each connector 341 couples to a mating connector in storage server 311. In other examples, each connector 341 can be coupled to the storage server 311 in other manners or each connector 341 can be individually coupled over a storage link to access system 340.

An example detailed view of HDD 320A is shown in FIG. 3A to illustrate the rotating storage media 321 and heat (or thermal) sensor 327. Each HDD can comprise similar elements, such as rotating storage media, read/write heads, and optionally vibration sensors, although variations are possible among HDDs. HDDs can include further elements, such as armatures, preamps, transceivers, processors, amplifiers, motors, servos, cases, seals, enclosures, and other electrical and mechanical elements. It should be understood that variations are possible for HDD 320A or other HDDs. Each HDD can instead comprise hybrid disk drives, which include rotating media and solid state storage components, which work in tandem. In further examples, solid state drives (SSDs), optical storage drives, or other non-transitory computer-readable storage devices are employed.

In FIG. 3A, each HDD also optionally includes an associated heat (or thermal) sensor 327. The heat (or thermal) sensors can be included among the electronic or mechanical elements of each HDD and can measure surface temperatures and/or heat dissipation associated with the corresponding HDD.

Figure 6:
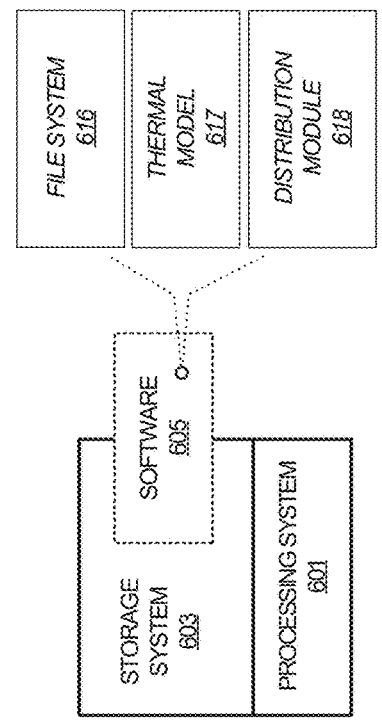
FIG. 6 depicts a block diagram illustrating an example system.

Storage server 311 is communicatively coupled to each HDD and can present a unified interface 330 to access system 340. Each HDD can be coupled to storage server 311 by one or more storage links over connectors 341, such as Serial Attached SCSI (SAS) links, although other link types can be employed. FIG. 6 illustrates storage server 610 which can be one example of storage server 311 employed in storage assembly 310.

Storage assembly 310 includes power assembly 345 which comprises power electronics as well as one or more ventilation fans 344 to provide airflow to storage assembly 310. Storage assembly 310 also includes storage chassis 342 which comprises structural elements to house and structurally support the elements of storage assembly 310. Chassis 342 can include chassis elements, enclosures, cases, frames, fastening elements, rackmount features, ventilation features, among other elements. Power supply elements are included to convert external power sources or provide various forms of electrical power to the elements of storage assembly 310. Fans 344A-344B can comprise any fan type, such as axial-flow, centrifugal and cross-flow, or other fan types, including associated louvers, fins, or other directional elements, including combinations and variations thereof.

FIG. 3B is a diagram illustrating a top view of storage assembly 310 having fans 344A and 344B on one side pulling out hot air while cold air enters the enclosure at the opposite end via air intake 360. Optional air temperature or speed sensors 365a and 365b can measure inlet air characteristics as discussed herein. The storage assembly configuration results in an air temperature distribution across the subsystem. Elements or components of the access system 340 and/or the storage server 311 can model thermal characteristics of the components of the system including the data storage devices and air intake characteristics of the enclosure to identify an optimal allocation of a workload. As discussed herein, the access system 340 and/or the storage server 311 can distribute a workload among the data storage devices based on the identified workload allocation.

FIG. 4A illustrates an example predicted air temperature distribution 410A that occurs as a result of a uniform power/workload distribution 412A. As shown, in temperature distribution 410A, air warms as it traverses the storage assembly and thus storage devices become warmer the closer they are to the fans 344A and 344B.

FIG. 4B illustrates an example predicted air temperature distribution 410B that occurs as a result of a nonuniform power/workload distribution 412B. The predicted air temperature distribution is modeled based on various thermal and air characteristics that are fed back to the system. As discussed, the distribution of the storage operations can be optimized based on the model to increase collective IOPS of the multiple data storage devices while maintaining surface temperature below a safe threshold for each of the multiple data storage devices. In the example of FIG. 4B, power/workload distribution 412B is determined to provide maximum IOPs while maintaining surface temperature below a safe threshold.

Counterintuitively, in some embodiments, the thermal model generates thermal aware allocations or distributions of the operations that more heavily allocate storage operations to the storage devices that are running hotter—those closest to the fans. The thermal aware allocation or distribution scheme may also more heavily distribute storage operations to storage devices nearer the edges of the enclosure. As illustrated in the example of FIG. 4B, this type of nonuniform distribution results in air entering the enclosure and staying cooler for a longer period of time whilst traversing the enclosure.

Figure 5:
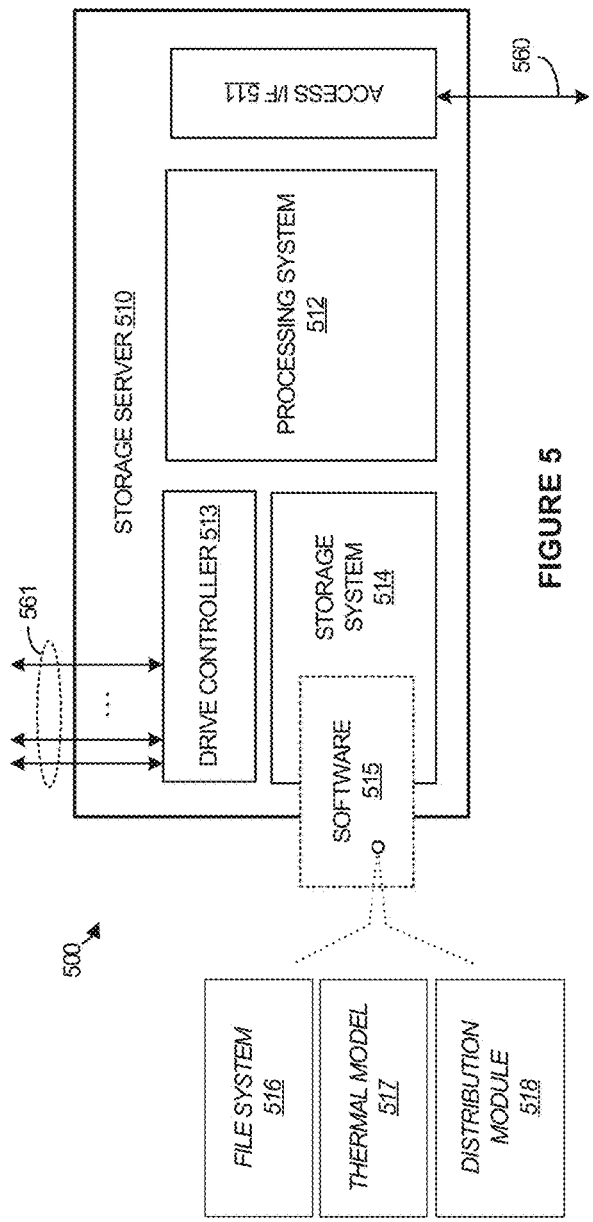
FIG. 5 depicts a block diagram illustrating an example storage server.

FIG. 5 is a block diagram illustrating storage server 510. Storage server 510 handles storage operations for a storage assembly. Storage server 510 can be an example of storage server 111 of FIG. 1, storage server 311 of FIG. 3A, or included, in whole or in part, in elements of access system 140 of FIG. 1 or access system 340 of FIG. 3, although variations are possible. When storage server 510 is included in a data storage assembly, storage server 510 receives storage operations from access systems over storage link 560 by access interface 511. Write data can be received in one or more write operations, and read data can be provided to hosts responsive to one or more read operations.

Storage server 510 includes access interface (I/F) 511, processing system 512, drive controller 513, and storage system 514. Furthermore, storage server 510 includes software (or firmware) 515 which includes include a file system 516 (such as object storage software), a thermal model 517, and a distribution module 518 which, when executed by at least processing system 512, operates as described below.

Access interface 511 includes one or more storage interfaces for communicating with access (or host) systems, networks, and the like over at least link 560. Access interface 511 can comprise transceivers, interface circuitry, connectors, buffers, microcontrollers, and other interface equipment. Access interface 511 can also include one or more I/O queues which receive storage operations over link 560 and buffer these storage operations for handling by processing system 512. Link 560 can include one or more Ethernet interfaces, SATA interfaces, SAS interfaces, FibreChannel interfaces, USB interfaces, SCSI interfaces, InfiniBand interfaces, NVMe interfaces, or IP interfaces, which allow the host system to access the storage capacity of HDD assembly.

Processing system 512 can comprise one or more microprocessors and other circuitry that retrieves and executes software 515 from storage system 514. Processing system 512 can be implemented within a single processing device but can also be distributed across multiple processing devices or sub-systems that cooperate in executing program instructions. Examples of processing system 512 include general purpose central processing units, application specific processors, and logic devices, as well as any other type of processing device, combinations, or variations thereof. In some examples, processing system 512 includes a system-on-a-chip device or microprocessor device, such as an Intel Atom processor, MIPS Technologies microprocessor, and the like.

Drive controller 513 can include one or more drive control circuits and processors which can control various data redundancy handling among the various data storage devices of a storage assembly. Drive controller 513 also includes storage interfaces 561, such as SAS interfaces to couple to the various data storage devices in a storage assembly. In some examples, drive controller 513 and processing system 512 communicate over a peripheral component interconnect express (PCIe) interface or other communication interfaces. In some examples, drive controller 513 comprises a RAID controller, RAID processor, or other RAID circuitry. In other examples, drive controller 513 handles management of a particular recording technology, such as SMR or HAMR techniques. As mentioned herein, elements and functions of drive controller 513 can be integrated with processing system 512.

Storage system 514 can comprise any non-transitory computer readable storage media readable by processing system 512 or drive controller 513 and capable of storing software 515. Storage system 514 can include volatile and nonvolatile, removable and non-removable media implemented in any method or technology for storage of information, such as computer readable instructions, data structures, program modules, or other data. In addition to storage media, in some implementations, storage system 514 can also include communication media over which software 515 can be communicated. Storage system 514 can be implemented as a single storage device but can also be implemented across multiple storage devices or sub-systems co-located or distributed relative to each other. Storage system 514 can comprise additional elements, such as a controller, capable of communicating with processing system 512. Examples of storage media of storage system 514 include random access memory, read only memory, magnetic disks, optical disks, flash memory, SSDs, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Software 515, file system 516, thermal model 517 and distribution module 518 can be implemented in program instructions and among other functions can, when executed by storage server 510 in general or processing system 512 in particular, direct storage server 510 or processing system 512 to operate data storage systems as described herein. Software 515 can include additional processes, programs, or components, such as operating system software, database software, or application software. Software 515, file system 516, thermal model 517, and distribution module 518 can also comprise software or some other form of machine-readable processing instructions executable by processing system 512. In at least one implementation, the program instructions can include first program instructions that direct storage server 510 to: model thermal characteristics of a data storage system based on inlet air characteristics of the enclosure, performance characteristics and thermal constraints of the data storage devices, and constraints of a workload (thermal model 517); identify a thermal aware allocation of the workload among the data storage devices based on the model (thermal model 517); and distribute the workload among the data storage devices in accordance with the thermal aware allocation (file system 516 and/or distribution module 518), among other operations.

In general, software 515 can, when loaded into processing system 512 and executed, transform processing system 512 overall from a general-purpose computing system into a special-purpose computing system customized to operate as described herein. The specific transformation of the physical structure can depend on various factors in different implementations of this description. Examples of such factors can include, but are not limited to, the technology used to implement the storage media of storage system 514 and whether the computer-storage media are characterized as primary or secondary storage. For example, if the computer-storage media are implemented as semiconductor-based memory, software 515 can transform the physical state of the semiconductor memory when the program is encoded therein. For example, software 515 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Referring now FIG. 6, system 600 and the associated discussion are intended to provide a brief, general description of a suitable computing environment in which various processes may be implemented, in whole or in part. Other configurations of computing devices and software computing systems may be employed to implement these processes.

System 600 may be any type of computing system capable of generating read and write requests to a data storage system, such as a desktop computer, laptop computer, notepad computer, tablet computer, server computer, client computer, mobile computing device, internet appliance, or any combination or variation thereof. System 600 may be implemented as a single computing system, but may also be implemented in a distributed manner across multiple computing systems. For example, system 600 may be representative of an access system such as, for example, access system 140 or a storage system such as storage server 111. Indeed, system 600 is provided as an example of a general purpose computing system that, when implementing processes discussed herein in either a distributed or non-distributed manner, becomes a specialized system.

System 600 includes processing system 601, storage system 603, and software 605. Processing system 601 is communicatively coupled with storage system 603. Storage system 603 stores software 605 which, when executed by processing system 601, directs system 600 to operate as described herein.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include a general purpose central processing unit, application specific processors, and graphics processors, as well as any other type of processing device.

Storage system 603 may comprise any storage media readable by processing system 601 and capable of storing software 605. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems. Storage system 603 may comprise additional elements, such as a controller, capable of communicating with processing system 601.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 605 comprises computer program instructions, firmware, or some other form of machine-readable processing instructions having various processes discussed herein embodied thereon. Software 605 may be implemented as a single application but also as multiple applications. Software 605 may be a stand-alone application but may also be implemented within other applications distributed on multiple devices, including but not limited to productivity application software and operating system software.

In general, software 605 may, when loaded into processing system 601 and executed, transform processing system 601, and system 600 overall, from a general-purpose computing system into a special-purpose computing system customized to distribute storage operations as discussed herein. For example, in at least one implementation, the program instructions can include first program instructions that direct system 600 to: model thermal characteristics of a data storage system based on inlet air characteristics of the enclosure, performance characteristics and thermal constraints of the data storage devices, and constraints of a workload (thermal model 617); identify a thermal aware allocation of the workload among the data storage devices based on the model (thermal model 617); and distribute the workload among the data storage devices in accordance with the thermal aware allocation (file system 616 and/or distribution module 618), among other operations.

Encoding software 605 may also transform the physical structure of storage system 603. The specific transformation of the physical structure may depend on various factors in different implementations of this description. Examples of such factors may include, but are not limited to: the technology used to implement the storage media of storage system 603, whether the computer-storage media are characterized as primary or secondary storage, and the like.

For example, if the computer-storage media are implemented as semiconductor-based memory, software 605 may transform the physical state of the semiconductor memory when the software is encoded therein. For example, software 605 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

System 600 may have additional devices, features, or functionality. For example, system 600 may optionally have input devices such as a keyboard, a mouse, a voice input device, or a touch input device, and comparable input devices. Output devices such as a display, speakers, printer, and other types of output devices may also be included. System 600 may also contain communication connections and devices that allow system 600 to communicate with other devices, such as over a wired or wireless network in a distributed computing and communication environment. These devices are well known in the art and need not be discussed at length here.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage system, comprising:
multiple data storage devices, each configured to store data;
an enclosure configured to encase and physically support the multiple data storage devices; and
a control system configured to:
model thermal characteristics of the data storage system based on inlet air characteristics of the enclosure, performance characteristics and thermal constraints of the data storage devices, and constraints of a workload;
identify, based on the thermal model, a thermal-aware allocation of the workload among the data storage devices; and
distribute the workload among the data storage devices in accordance with the thermal-aware allocation.

2. A method of distributing a workload among data storage devices encased in an enclosure of a data storage system, the method comprising:
identifying performance characteristics and thermal constraints associated with the data storage devices;
identifying inlet air characteristics of the enclosure;
identifying constraints associated with the workload;
modeling thermal characteristics of the data storage system based on the inlet air characteristics of the enclosure, the performance characteristics and thermal constraints of the data storage devices, and the constraints associated with the workload;
identifying, based on the thermal model, a thermal-aware allocation of the workload among the data storage devices; and
distributing the workload among the data storage devices in accordance with the thermal-aware allocation.

3. The method of claim 2, wherein the thermal-aware allocation maximizes collective Input/Output Operations Per Second (IOPS) of the multiple data storage devices relative to other allocations of the workload while maintaining the multiple data storage devices within the thermal constraints of the data storage devices.

4. The method of claim 2, wherein identifying the inlet air characteristics of the enclosure comprises estimating one or more of the inlet air characteristics based on fan drive signal characteristics.

5. The method of claim 2, wherein:
identifying the inlet air characteristics of the enclosure comprises monitoring air temperature sensors and/or air speed sensors to determine one or more of the inlet air characteristics; and
the inlet air characteristics comprise one or more of air temperature and/or air speed.

6. The method of claim 2, wherein the performance characteristics of the data storage devices comprise power versus performance operating curves of each of the data storage devices.

7. The method of claim 2, wherein the thermal constraints of the data storage devices comprise one or more safe operating temperature thresholds.

8. The method of claim 2, wherein the constraints of the workload comprise a breakdown of read operations and write operations.

9. A computer-readable storage medium having instructions stored thereon which, when executed by one or more processors, cause the one or more processors to:
identify performance characteristics and thermal constraints associated with data storage devices encased in an enclosure of a data storage system;
identify inlet air characteristics of the enclosure;
identify constraints associated with a workload;
model thermal characteristics of the data storage system based on the inlet air characteristics of the enclosure, the performance characteristics and thermal constraints of the data storage devices, and the constraints associated with the workload;
identify, based on the thermal model, a thermal-aware allocation of the workload among the data storage devices; and
distribute the workload in accordance with the thermal-aware allocation.

10. A control system for a data storage system, wherein the data storage system comprises an enclosure and data storage devices encased within the enclosure, the control system comprising:
means for modeling thermal characteristics of the data storage system based on inlet air characteristics of the enclosure, performance characteristics and thermal constraints of the data storage devices, and constraints of a workload;
means for identifying, based on the modeled thermal characteristics, a thermal-aware allocation of the workload among the data storage devices; and
means for distributing the workload among the data storage devices in accordance with the thermal-aware allocation.

11. A data storage assembly comprising:
an enclosure configured to encase and physically support multiple data storage devices; and
a control system configured to:
identify a thermal model for the data storage assembly based at least on inlet air characteristics of the enclosure, performance characteristics and thermal constraints of the data storage devices, and characteristics of a workload;
identify, based on the thermal model, a thermal-aware allocation of the workload among the data storage devices; and
distribute the workload among the data storage devices in accordance with the thermal-aware allocation.

12. The data storage assembly of claim 11, wherein the thermal-aware allocation maximizes collective Input/Output Operations Per Second (IOPS) of the multiple data storage devices relative to other allocations of the workload while maintaining the multiple data storage devices within the thermal constraints of the data storage devices.

13. The data storage assembly of claim 11, wherein the control system is further configured to estimate one or more of the inlet air characteristics based on fan drive signal characteristics.

14. The data storage assembly of claim 13, wherein the fan drive signal characteristics comprise a voltage or a duty cycle.

15. The data storage assembly of claim 11, wherein:
the control system is further configured to monitor air temperature sensors and/or air speed sensors to determine one or more of the inlet air characteristics, and
the inlet air characteristics comprise one or more of air temperature and/or air speed.

16. The data storage assembly of claim 11, further comprising:
one or more fans configured to provide airflow within the enclosure;
thermal sensors configured to measure temperatures of each of the multiple data storage devices; and
one or more sensors configured to measure one or more of the inlet air characteristics.

17. The data storage assembly of claim 11, wherein the performance characteristics of the data storage devices comprise power versus performance operating curves of each of the data storage devices.

18. The data storage assembly of claim 11, wherein the data storage devices are thermally-coupled within the enclosure.

19. The data storage assembly of claim 11, wherein the thermal constraints of the data storage devices comprise one or more safe operating temperature thresholds.

20. The data storage assembly of claim 19, wherein the control system is further configured to:
monitor temperatures of each of the multiple data storage devices to ensure that the data storage devices do not exceed the one or more safe operating temperature thresholds.

21. The data storage assembly of claim 11, wherein the constraints of the workload comprise a breakdown of read operations and write operations.

* * * * *